July 15, 1958 B. M. OLIVER 2,843,447

PROBABILITY OSCILLOGRAPH

Filed Nov. 1, 1951 2 Sheets-Sheet 1

INVENTOR
B. M. OLIVER

BY Hugh S. Wertz
ATTORNEY

July 15, 1958 B. M. OLIVER 2,843,447

PROBABILITY OSCILLOGRAPH

Filed Nov. 1, 1951 2 Sheets-Sheet 2

INVENTOR
B. M. OLIVER
BY Hugh S. Wertz
ATTORNEY 2,843,447

PROBABILITY OSCILLOGRAPH

Bernard M. Oliver, Morristown, N. J., assignor to Bell Telephone Laboratories, Incorporated, New York, N. Y., a corporation of New York Application November 1, 1951, Serial No. 254,295

8 Claims. (Cl. 346—110)

This invention relates to cathode-ray deflection devices and more specifically to devices for drawing the amplitude-probability distribution of a message wave.

It can readily be shown, by the application of certain principles of statistical mechanics to communication theory, that most present-day communication systems employ a channel capacity greater than that which is actually necessary to describe the message. That is, present-day systems provide sufficient channel capacity to transmit successive samples of a given message which are completely independent of each other, whereas typical communication message samples (e. g., speech, music, or television signals) exhibit a considerable degree of interdependence or correlation. By taking advantage of this correlation, the requisite channel capacity of a system can be materially lessened, and to the extent that this correlation is not utilized, the system is ineffiecient. One technique for utilizing the limitation of freedom of choice which is exhibited by most communication signals is to employ a statistical summary, as it were, of the probability of occurrence of any given signal and to adapt the transmission system to accommodate preferentially those signals which are more probable of occurrence.

In constructing such a summary or in otherwise studying the statistics of a communication signal for any purpose whatsoever, a device capable of automatically drawing the amplitude-probability distribution of a communication signal is of manifest utility.

It is accordingly the principal object of the present invention to provide a device which automatically draws the amplitude-probability distribution of a signal to be analyzed.

This object is attained in accordance with the invention by a cathode-ray tube whose beam is deflected in one dimension by the signal wave, by optical means which operate on the light from the fluorescent spot of said cathode-ray tube, and by a photographic film which integrates the resulting light distribution over a suitable period of time.

The invention will be more fully understood by referring to the following description taken in connection with the accompanying drawings forming a part thereof in which.

Before referring specifically to the drawings, it will be of value to examine certain fundamentals and to establish certain definitions. As used herein, the term "amplitude distribution" (or "probability density") is a measure of the average relative time which the signal spends at each point in its amplitude range. It is, of course, a function of amplitude and, in a graphical representation, it is generally plotted as the ordinate, while the abscissa represents the signal value $x$. If the ordinate is normalized so as to make the area under the curve unity, it is called the probability density $p(x)$. Employing this terminology, $$\int_{-\infty}^{\infty} p(x)\,dx = 1$$

The probability of finding the signal between amplitudes $x_1$ and $x_1+dx$ is $p(x_1)dx$, and the probability of finding it between amplitudes $a$ and $b$ is $$^{b}\int_{a} p(x)\,dx$$

This sort of analysis is applicable to both random functions and periodic functions. The use of the word "probability" is justifiable in the case of periodic functions in that the inquiry may be concerned with the probability that the signal has a particular value at some randomly chosen instant. For a still picture, the signal is periodic though highly complicated, and if an average is taken of the results obtained from a well chosen group of still pictures, a study can in effect be made of the statistics of an ensemble of television signals.

Figure 1:
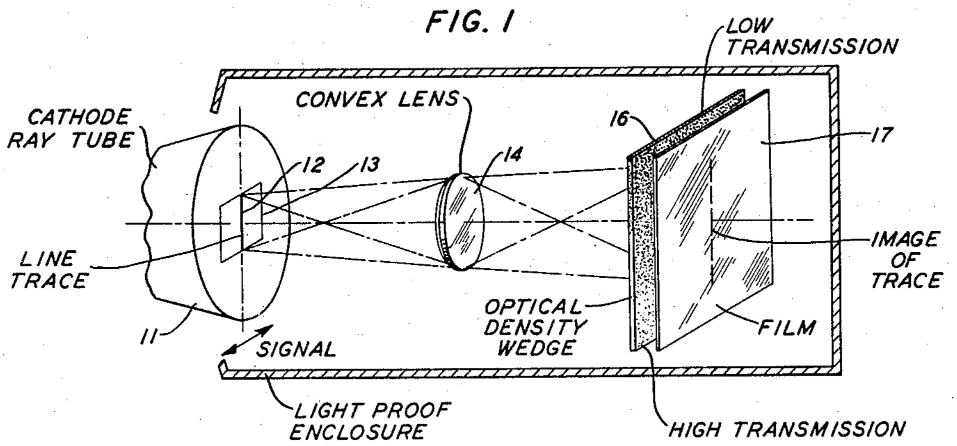
Fig. 1 is a schematic representation of the basic optical arrangement of an exemplary embodiment of the invention.

It is obvious that the measurement of amplitude distribution must involve some type of threshold device sensitive to amplitude, such as, for example, a clipper which produces an output only when the input is between certain amplitude levels. In accordance with the present invention, the device which is used to record amplitude distribution is basically a high contrast photographic film in conjunction with an optical density wedge. This film either is or is not blackened in various areas, depending on the exact amount of exposure. The basic components of a simple illustrative embodiment of the invention are shown in Fig. 1. It will be convenient for simplicity of terminology to designate the cathode-ray device which draws the amplitude distribution patterns a probabiloscope. A vertical line trace 12 on the screen of a cathode-ray tube 11, provided by any suitable means as for example a uniform ribbon electron beam, is deflected horizontally by the signal which is being examined. The result is substantially a rectangular field 13 with uniform brightness in the vertical direction but with a signal dependent light distribution in the horizontal direction. This rectangular field is focussed by a convex lens 14 onto a high contrast film 17 through an optical density wedge 16 which has the effect of diminishing the incident light intensity exponentially from its full value at the bottom to, by way of example, one thousandth of this value at the top. As a result the film is exposed to a light distribution which varies from top to bottom exponentially regardless of the signal amplitude distribution and from left to right linearly in proportion to the signal amplitude distribution. The exposure at any point is thus proportional to the product of the time spent at the horizontal coordinate and the transmission associated with the vertical coordinate.

It is obvious that if any constant exposure contour is traced out on the exposed photographic film the result is a plot of $p(x)$ versus $x$, with the $x$ scale linear and the $p(x)$ scale logarithmic. The high contrast film 17 effectively selects a particular exposure contour automatically by being blackened only up to this contour. This is so because above the contour there is not enough to affect the film. Because of the exponential transmission characteristic of the density wedge, a change in exposure will merely shift the contour up or down without changing its shape. This feature makes for greater exposure latitude and greater ease in comparing curves than would be possible with a linear $p(x)$ scale. Also all values of $p(x)$ are determined with equal percentage accuracy with the logarithmic scale.

Figure 2:
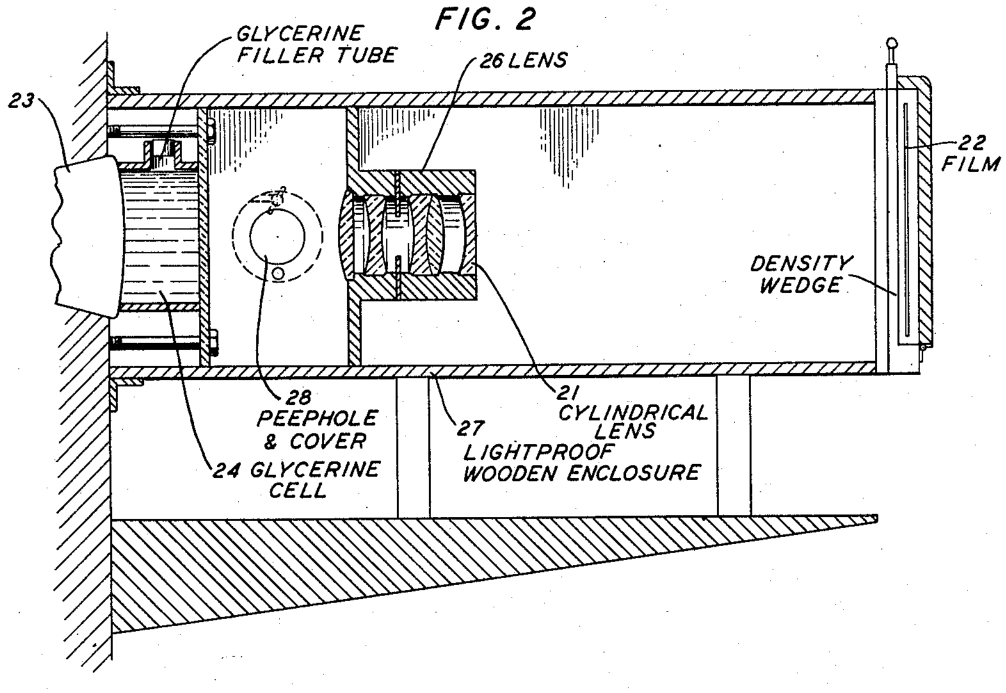
Fig. 2 is a view, partially schematic and partially in cross section, of a more complete embodiment of the arrangement shown schematically in Fig. 1.

Fig. 2 shows the details of the optical portion of a specific embodiment of a probabiloscope which has been built and successfully operated. While this specific embodiment has proven highly successful, it is to be understood that many other specific embodiments are within the ambit of the invention and in certain instances are perhaps preferable to that described herein. In this apparatus, the signal deflection is again horizontal, and the wedge opaqueness density decreases from top to bottom. The invention is described in this particular orientation because of the desirability of exhibiting the $p(x)$ vs. $x$ curve in its customary orientation, i. e., with $p(x)$ vertical and $x$ horizontal. It is, of course, perfectly feasible to employ other suitable orientations.

Instead of utilization of a vertical line trace on the cathode-ray screen as described above, in this arrangement the vertical line trace is generated optically by means of an astigmatic lens system which forms a vertical line image on the film 22 of a light spot which appears on the face of the cathode-ray tube 23. This arrangement permits the use of a conventional cathode-ray beam source, and also obviates the need for electrical astigmatizing or sweep arrangements. However, there is employed additionally a small 60-cycle sinusoidal vertical sweep, merely to allow the use of high beam currents without burning the phosphor. So long as the 60-cycle sweep does not exceed a certain magnitude, light from each point along this sweep trace is uniformly distributed in the vertical direction along the density wedge by the action of the cylindrical lens 21.

A glycerine cell 24 is mounted in front of the cathode-ray tube face, the glycerine being in direct optical contact with the tube face and having the same refractive index. This arrangement greatly reduce halos resulting from total internal reflections within the tube face, which is one of the potential difficulties which may be encountered in the practice of this version of the invention.

In this particular embodiment, the lens system used consists of a conventional multielement lens 26 which by itself would form a sharp image on the film of the cathode-ray tube face at a magnification of two. To this lens a supplementary cylindrical concave element, 21, is added which reduces the power in the vertical plane but which has no effect in the horizontal plane. As a result the image of the cathode-ray tube spot remains sharp in the horizontal direction but is elongated vertically into a line of uniform brightness. The result is nearly the same as would be obtained with a single positive cylindrical element alone, but the aberrations are less since the image is formed by a corrected lens and then destroyed in one dimension only by the simple uncorrected cylindrical element. The various elements are adjusted to give a useful field of about 3½ inches×3½ inches size. Thus, using a density wedge having a decrement of one decade in 0.80 inch there is made available a maximum range of 4.4 decades. With a density wedge having a decrement of one decade in 1.25 inches, a maximum range of 2.8 decades is available. The entire optical system is inclosed in a removable light-proof box 27, provided with a peep-hole 28 to permit inspection of the cathode-ray tube face. The exposure is controlled by the duration for which the beam is switched on and the intensity setting during this time.

A cathode-ray tube which has operated very satisfactorily in the practice of this specific embodiment of the invention is the 5XP11 cathode-ray tube, having a blue phosphor on a five inch face. The various lenses used in the optical set-up are, in this preferred embodiment, coated to reduce any potential difficulties from flare images arising from reflections from lens surfaces.

Figure 3:
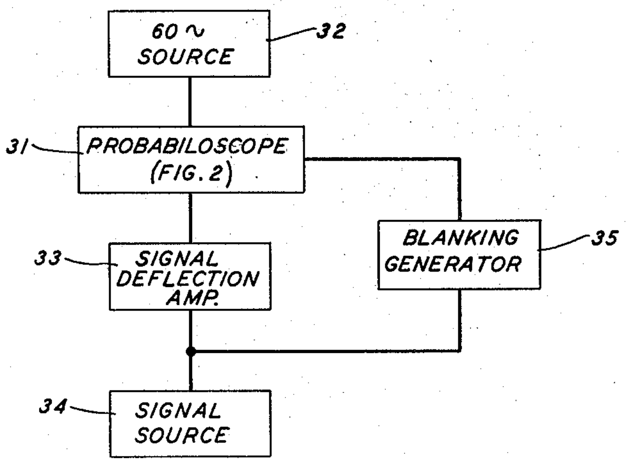
Figs. 3 and 4 are schematic block diagrams of the electrical connections of two exemplary embodiments of the invention.

Fig. 3 is a block diagram of the electrical set-up of the probabiloscope shown in part pictorially in Fig. 2. The cathode-ray tube and the associated optical equipment shown there are here shown as the block 31. A signal amplifier 33 is utilized to operate on the signal from the input source 34, which signal is thereafter applied to the horizontal deflecting means of the cathode-ray tube. The vertical deflecting means is supplied with a 60 cycle signal from the generator 32 to provide the vertical sweep described above. Additionally, there is also included a blanking generator or amplitude selector 35, which is capable of generating blanking (or alternatively, enabling) pulses corresponding to an amplitude range of adjustable width and level. These pulses are then applied to the intensity control grid of the cathode-ray tube. This blanking equipment is not used in ordinary exposures, but it can serve either of two purposes: first, to extend the effective dynamic range of the instrument by making it possible to look at only a limited amplitude range at a time, the rest being blanked out; second, to make possible the measurement of conditional probability by turning the beam on only if the signal was within a certain (adjustable) amplitude range one or more Nyquist intervals in the past as will be discussed more fully in connection with the arrangement of Fig. 4.

It may be of value to those who would practice the invention to describe a specific illustrative procedure for taking a probability distribution photograph in accordance with the invention, just as a particular structural embodiment of the invention has been described. This of course is not the only possible method which can be used, but it is one which has been proven to be quite successful. The first step is to adjust the signal magnitude so that the greatest peak-to-peak excursion covers a predetermined span on the cathode-ray tube face, and hence on the film. This determines the width of the probability curve at its base. The corresponding signal magnitude may be called "zero decibels." Occasionally, the level may be set at some higher value, such as 6 decibels or 20 decibels, for example, so as to give a magnified view of a portion of the curve. Next, the beam current is adjusted, generally to the highest value possible without blooming or without burning the brightest part of the phosphor. This depends largely, of course, on the amplitude distribution of the signal. The next step obviously is to determine the proper exposure. The effective exposure is the product of beam current and exposure time. It is most readily specified in terms of a "flat" amplitude distribution (input signal a saw-tooth or triangular wave at zero decibel level). "Full scale" exposure is defined as that amount of exposure which blackens almost the entire film, up to the densest part of the wedge, leaving just enough unblackened film to determine the transition contour.

Theoretically the dynamic range of probability density obtained in one photograph is the range of density wedge, 2.8 or 4.4 decades, respectively. The actual attainable range, however, is limited by stray light and/or lens flare, depending on the nature of the amplitude distribution. It is generally between two and three decades.

The available range of approximately two and one half decades is more than sufficient for some problems, such as computation of the standard deviation. However, it is far from sufficient if one is interested in the probability density at the least probable level, which may be as low as one millionth of the maximum density. In such a case, after one has obtained a characteristic giving the top two decades of the distribution curve, there remains to determine four more decades below these. By increasing the exposure one hundred times the next two decades can be brought on scale, but these will be largely lost in the stray light and flare from the peaks of the top two decades of the probability density curve. The remedy is to blank these two decades by shutting off the cathode-ray beam whenever the signal passes through the more probable amplitude range or ranges. To obtain the next and final two decades, the exposure is stepped up by another factor of 100, and all but the most improbable amplitude ranges are blanked out. In practice, this means that the beam is off almost all of the time and pulsed on only for relatively few and brief periods. To avoid excessively long exposure times, the peak beam current should be increased consistent with safe operation of the cathode-ray tube. After there have been obtained three separate photographs for adjoining probability density ranges in this way, one can simply fit them together to obtain a single curve extending over six decades.

In order to realize the full potential of the probabiloscope it is preferable to derive more sharply defined curves than those resulting from the original exposures. By printing the original film onto a second high contrast film, and then again printing from the second film, the gamma is greatly increased and with it the sharpness of the black to white transition. In particular, there has been developed a photographic process which greatly enhances the appearance and usefulness of the probability curves. It transforms the transition zone between black and white into a black line against a white background. This process requires two additional steps, one so-called "reversal print" and one final print. Inasmuch as the reversal print provides a further increase in gamma, only two printing steps need be carried out prior to the reversing process, making a total of four steps, not including the original exposure. The reversing process commences like an ordinary printing process on film but while the film is in the developer tray almost fully developed light is flashed on it. This blackens all the unexposed regions while leaving the transition bands with considerable transmission because not enough light reaches them through the partially blackened developed surface to cause much further blackening. The result is a gray curve on a relatively black background. Upon high contrast printing this yields a black curve on a white background.

The type of probability curve which has been discussed above is the so-called simple probability density distribution. For many purposes, however, that which is of interest is the conditional probability, i. e., the probability density distribution for a signal with a specified past history extending back over a finite time. Such probability can, in accordance with the invention, be measured by blanking all of the signal except for those instances which are preceded by the specified history. This technique is most readily illustrated in terms of a sampled signal, and a simple but generally important case is that in which addition is limited to those samples that follow those which are within a specified amplitude range. The amplitude selector (shown as the blanking generator 35 in the arrangement of Fig. 3), in conjunction with a delay line, is capable of supplying the necessary enabling pulses if it is supplied with a properly delayed signal. Several such circuits, in conjunction with a tapped delay line and coincidence gates, can be used to obtain higher order conditional probability curves, in which the past history pertains to more than just one previous sample. If, for purposes of illustration, it is assumed that the delay corresponds to the time between adjacent elements in a television picture, it is then possible to obtain the probability distribution of brightness of any particular element, given a certain brightness or brightnesses for the preceding element or elements. The record obtained is a distribution corresponding to $P_{x_1, x_2, x_3 \ldots x_n}(y)$, i. e., the probability that if (and only if) the previous sample amplitudes were $x_1, x_2, x_3 \ldots x_n$, the present amplitude is $y$.

Figure 4:
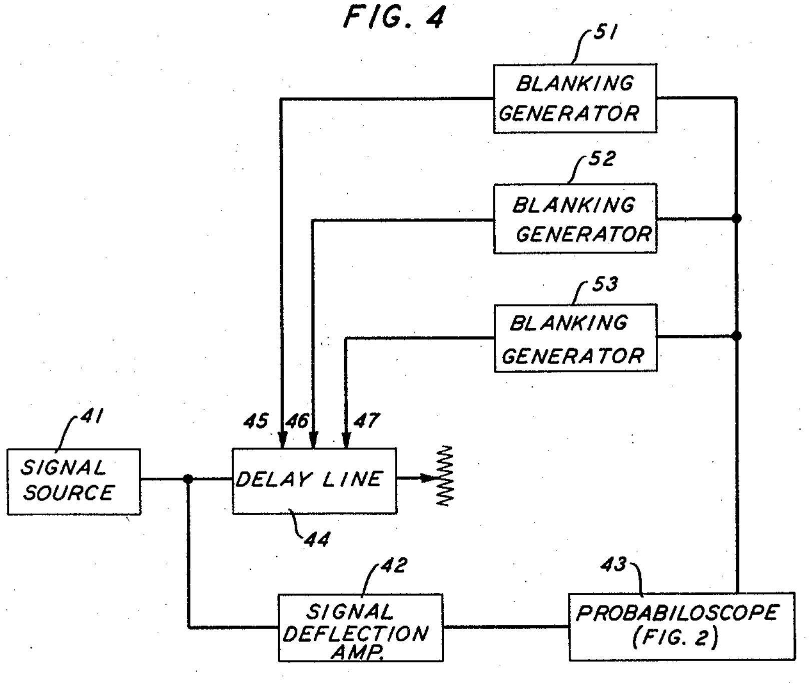

By way of illustration, Fig. 4 shows in block form an arrangement adapted for measuring the probability distribution of rightness of any particular element of a television picture conditioned on the brightness of the three immediately preceding elements. In this case, the signal whose distribution is to be measured is applied from the source 41 both to the input end of the tapped delay line 44 and to the signal deflection amplifier 42 for application to the horizontal deflection means of the probabiloscope 43. By proper adjustment of the taps 45, 46 and 47, there are derived therefrom samples corresponding to the three samples immediately preceding the sample being then applied to the probabiloscope. Each of these derived samples controls a corresponding blanking generator amplitude selector 51, 52, 53 as in the arrangement of Fig. 3. When the amplitude of any one of the three derived samples does not fall within the range being investigated, then there is provided from the associated blanking generator a blanking pulse which is applied to the intensity control grid of the probabiloscope to turn off the cathode-ray beam. As a result, only samples which are immediately preceded by three samples all of which fall within the specified range will be effective in determining the desired probability distribution curve.

It is to be understood that the above-described arrangements are illustrative of the principles of the invention. Numerous other arrangements may be devised by those skilled in the art without departing from the spirit and scope of the invention.

What is claimed is:

1. In a system for drawing the conditional probability function of a message wave, means supplied with an input message wave for deriving signal samples, a light source for forming a line trace of light, means for deflecting the line trace of light in accordance with the amplitude of signal samples, light sensitive recording means in the path of said line trace of light, light absorbing means interposed between said light source and light sensitive means having absorption properties uniform in the direction of beam deflection and varying in accordance with a given function in the direction transverse to said last mentioned direction, enabling means supplied with the derived signal samples for providing control pulses when the derived signal samples are in a specified amplitude range, and means for utilizing said control pulses for energizing said light source.

2. The method of drawing automatically the amplitude probability distribution of a message wave comprising the steps of forming a line trace of light whose intensity varies in accordance with a predetermined function between the two ends of the trace, displacing this line trace in a direction perpendicular to its length in accordance with the amplitude of the message wave, and exposing light sensitive film to repeated excursions of this line trace for effecting an integration of the light from the line trace.

3. Apparatus for drawing the amplitude probability function of a message wave comprising means for forming a line trace of light whose intensity varies in a predetermined manner over its length, means to be supplied with the message wave for displacing the line trace in a direction perpendicular to its length in accordance with the amplitude of the message wave, and light-sensitive recording means in the path of the line trace for intercepting said line trace for an extended period of time, said means for forming the line trace including a light source for producing a line trace of light having uniform intensity over its length and light absorbing means interposed between said light source and the light-sensitive recording means and having absorption properties uniform in the direction of line displacement and varying in accordance with a given function in a direction transverse to that of the line displacement.

4. Apparatus for drawing the amplitude probability function of a message wave comprising means for forming a line trace of light whose intensity varies logarithmically over its length, means to be supplied with the message wave for displacing the line trace in a direction perpendicular to its length in accordance with the amplitude of the message wave, and light-sensitive recording means in the path of the line trace for intercepting said line trace for an extended period of time, said means for forming the line trace including a light source for producing a line trace of light having a uniform intensity over its length and light absorbing means interposed in the path of the uniform line trace between said light source and the light-sensitive recording means and having absorption properties uniform in the direction of line displacement and varying in accordance with a logarithmic function in a direction transverse to that of the line displacement.

5. Apparatus for drawing the amplitude probability function of a message wave comprising means for forming a line trace of light whose intensity varies in a predetermined manner over its length, means for deflecting said line trace in a direction substantially perpendicular to its length in accordance with the amplitude of the message wave, and light-sensitive recording means in the path of the line trace for intercepting the line trace over an extended period of time, said means for forming the line trace including means for forming a light spot, a cylindrical lens interposed between said last-mentioned means and the light-sensitive recording means for transforming said light spot into a line trace of light having a uniform intensity over its length, and an optical density wedge interposed between said cylindrical lens and the light-sensitive recording means and having light transmission properties uniform in the direction of line displacement and varying in accordance with a predetermined function in a direction perpendicular to that of the line displacement.

6. The combination of elements set forth in claim 5 wherein the means for deflecting the line trace comprises means for deflecting the light spot.

7. Apparatus for drawing the amplitude probability function of a message wave comprising means for forming a line trace of light whose intensity varies in a predetermined manner over its length, means for deflecting said line trace in a direction substantially perpendicular to its length in accordance with the amplitude of the message wave, and light-sensitive recording means in the path of the line trace for intercepting the line trace over an extended period of time, said means for forming the line trace including a fluorescent screen, a source of electrons, means for directing electrons from said source against said fluorescent screen to form a light spot, a cylindrical lens interposed between said fluorescent screen and the light-sensitive recording means for transforming said light spot into a line trace of uniform intensity over its length, and an optical density wedge interposed between said cylindrical lens and the light-sensitive recording means and having absorption properties uniform in the direction of line displacement and varying in accordance with a given function in the direction perpendicular to that of line displacement.

8. Apparatus for drawing the amplitude probability function of a message wave comprising means for forming a line trace of light whose intensity varies in a predetermined manner over its length, means for deflecting said line trace in a direction substantially perpendicular to its length in accordance with the amplitude of the message wave, and light-sensitive recording means in the path of the line trace for intercepting the line trace over an extended period of time, said means for forming the line trace including a fluorescent screen, a source of a ribbon beam of electrons, means for directing the ribbon beam of electrons from said source against said fluorescent screen to form a line trace of light having a uniform intensity over its length, and an optical density wedge interposed between said fluorescent screen and the light-sensitive recording means and having absorption properties uniform in the direction of line displacement and varying in accordance with a given function in the direction perpendicular to that of line displacement.

References Cited in the file of this patent

UNITED STATES PATENTS

| | | |
|---|---|---|
| 2,189,583 | Hollmann | Feb. 6, 1940 |
| 2,495,790 | Valensi | Jan. 31, 1950 |
| 2,557,691 | Rieber | June 19, 1951 |